(12) United States Patent
Bex et al.

(10) Patent No.: US 9,387,827 B2
(45) Date of Patent: Jul. 12, 2016

(54) WIPER BLADE DEVICE

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 13/994,032

(22) PCT Filed: Nov. 8, 2011

(86) PCT No.: PCT/EP2011/069630
§ 371 (c)(1),
(2), (4) Date: Aug. 26, 2013

(87) PCT Pub. No.: WO2012/079854
PCT Pub. Date: Jun. 21, 2012

(65) Prior Publication Data
US 2013/0333147 A1 Dec. 19, 2013

(30) Foreign Application Priority Data
Dec. 13, 2010 (DE) .................. 10 2010 062 899

(51) Int. Cl.
*B60S 1/38* (2006.01)

(52) U.S. Cl.
CPC .............. *B60S 1/381* (2013.01); *B60S 1/3858* (2013.01); *B60S 1/3881* (2013.01); *B60S 2001/3818* (2013.01); *Y10T 29/49826* (2015.01)

(58) Field of Classification Search
CPC ...... B60S 1/381; B60S 1/3858; B60S 1/3856; B60S 1/3881; B60S 1/3877; B60S 1/3879; B60S 1/3849; B60S 1/3851; B60S 1/3894

USPC .......... 15/250.32, 250.201, 250.43, 15/250.451–250.454
See application file for complete search history.

(56) References Cited

U.S. PATENT DOCUMENTS

| | | | | |
|---|---|---|---|---|
| 2,923,021 | A * | 2/1960 | Hale | B60S 1/3801 15/250.453 |
| 5,493,750 | A * | 2/1996 | Bollen | B60S 1/3801 15/250.31 |
| 7,540,061 | B1 * | 6/2009 | Huang | 15/250.201 |
| 7,587,783 | B1 * | 9/2009 | Lin | 15/250.43 |
| 2004/0250369 | A1 * | 12/2004 | Matsumoto et al. | 15/250.201 |
| 2005/0166349 | A1 * | 8/2005 | Nakano et al. | 15/250.201 |
| 2006/0207050 | A1 * | 9/2006 | Shanmugham et al. | 15/250.43 |

(Continued)

FOREIGN PATENT DOCUMENTS

| CA | 2620386 A1 * | 8/2006 | B60S 1/38 |
|---|---|---|---|
| CN | 101674962 | 3/2010 | |

(Continued)

OTHER PUBLICATIONS

DE102008040063A1 (machine translation), 2010.*

(Continued)

*Primary Examiner* — Monica Carter
*Assistant Examiner* — Andrew A Horton
(74) *Attorney, Agent, or Firm* — Michael Best & Friedrich LLP

(57) ABSTRACT

The invention relates to a wiper blade device comprising a wiper strip unit (12) which has a wind-deflector element (16), a wiper lip (18) and a wiper strip element (14) which comprises a longitudinal guide channel (24) for a support element (20). According to the invention, the wiper strip element (14), in a mounted state, forms an interlocking connection with the wind-deflector element (16).

10 Claims, 5 Drawing Sheets

(56) References Cited

U.S. PATENT DOCUMENTS

| | | | |
|---|---|---|---|
| 2007/0143947 A1* | 6/2007 | Harita et al. | 15/250.04 |
| 2008/0052865 A1* | 3/2008 | Chiang | 15/250.43 |
| 2008/0098554 A1* | 5/2008 | Cho | 15/250.32 |
| 2008/0098559 A1* | 5/2008 | Machida et al. | 15/250.201 |
| 2008/0235896 A1* | 10/2008 | Cheng | 15/250.201 |
| 2008/0289133 A1* | 11/2008 | Kim | 15/250.32 |
| 2009/0100626 A1* | 4/2009 | Kim | 15/250.05 |
| 2010/0218333 A1* | 9/2010 | Ritt | 15/250.201 |
| 2010/0242204 A1 | 9/2010 | Chien | |

FOREIGN PATENT DOCUMENTS

| | | | |
|---|---|---|---|
| DE | 102005062462 | 6/2007 | |
| DE | EP 2127969 A2 * | 12/2009 | B60S 1/3877 |
| DE | 102008040063 A1 * | 1/2010 | B60S 1/38 |
| EP | 2103490 | 9/2009 | |
| FR | 2923785 | 5/2009 | |
| FR | 2943020 | 9/2010 | |
| JP | 20-0373660 | 1/2005 | |
| JP | 1020100102877 | 9/2010 | |
| KR | 2009042785 | 4/2009 | |
| WO | 2010/028918 | 3/2010 | |

OTHER PUBLICATIONS

EP2127969A2 (machine translation), 2009.*

International Search Report for Application No. PCT/EP2011/069630 dated Feb. 3, 2012 (2 pages).

* cited by examiner

WIPER BLADE DEVICE

BACKGROUND OF THE INVENTION

The invention relates to a wiper blade device.

A wiper blade device comprising a wiper strip unit is already known from the prior art, the latter including a wind-deflector element, a wiper lip and a wiper strip element which comprises a longitudinal guide channel for a support element.

SUMMARY OF THE INVENTION

The invention relates to a wiper blade device comprising a wiper strip unit which has a wind-deflector element, a wiper lip and a wiper strip element which comprises a longitudinal guide channel for a support element.

According to the invention, the wiper strip element, in a mounted state, forms an interlocking connection with the wind-deflector element, whereby a particularly quick mounting of the wiper blade device can be achieved. By the term "wiper strip unit", a unit is to be particularly understood in this context which is provided to connect a wiper blade adapter to a wiper lip. By the term "provided", particularly designed and/or equipped should especially be understood. By the term "wiper blade adapter", in particular an adapter is to be understood in this context which is provided to make a coupling region of the wiper blade device available for coupling to a wiper arm. By the term "wind-deflector element", an element is to be particularly understood in this context which is provided to deflect an air stream acting on the wiper blade device and/or to use said air stream to press the wiper lip against a window pane of the vehicle. The wind-deflector element preferably has at least one concave surface. By the term "wiper strip element", an element is thereby to be particularly understood in this context which is provided to connect the wind-deflector element, the support element and the wiper lip in an interlocking manner. By the term "longitudinal guide channel", a guide channel is to be particularly understood in this context which, in the mounted state, extends in a main extension direction parallel to a longitudinal direction of the wiper strip unit. By the term "longitudinal direction", a direction is to be particularly understood in this context which extends substantially parallel to a longitudinal extension of the support element. By the term "longitudinal extension", a greatest possible extension is to be particularly understood in this context. By the term "substantially" a deviation of less than 10°, preferably less than 5°, is to be particularly understood in this context. By the term "extension" of an element, a maximum distance between two points of a perpendicular projection of the element onto a plane is to be particularly understood in this context. By the term "support element", a resilient element is to be particularly understood in this context which has at least one extension that, in a normal operating state, can be elastically changed by at least 10%, in particular by at least 20%, preferably by at least 30% and particularly advantageously by at least 50%, and which support element particularly generates a counter force acting opposite to a change in the at least one extension, said counter force being a function of said change of the extension and being preferably proportional to said change.

In a further embodiment of the invention, it is proposed that the wiper strip element, in a mounted state, forms an interlocking connection with the wind-deflector element. In so doing, the wiper blade device can be particularly easily assembled.

If the wiper strip unit comprises a resilient support element that, in a mounted state, forms an interlocking connection with the wiper strip element, the support element can be securely held in the wiper strip unit.

If the wiper blade device comprises a wiper blade adapter, which, in a mounted state, forms an interlocking connection with the wiper strip unit, a particularly simple and secure coupling to a further component, such as a wiper arm, can be produced.

According to the invention, the wiper blade adapter can furthermore comprise a longitudinal guide unit, which is provided to receive the support element in an interlocking manner, whereby a particularly secure accommodation of the support element can be achieved. By the term "longitudinal guide unit", a unit is to be particularly understood in this context which is provided to guide a support element in the longitudinal direction. The longitudinal guide unit preferably comprises at least one guide groove extending in the longitudinal direction, which is provided to form an interlocking connection with the support element.

A secure connection of the wind-deflector element to the wiper strip element can be achieved if said wind-deflector element comprises at least one terminator element which, in a mounted state, forms an interlocking connection and prevents a movement of said wind-deflector element relative to the wiper strip element in a longitudinal direction. By the term "terminator element", an element is to be particularly understood in this context which is disposed at a free end of said wind-deflector element and is provided to engage in the longitudinal guide channel.

A particularly easy mounting of the wiper blade device can be achieved if the support element has at least one detent means which, in a mounted state, forms a detent connection with a wiper blade adapter. By the term "detent means", a means is to be particularly understood in this context which is provided to produce a detent connection to a resilient component which is deflected during mounting. The detent means is preferably embodied as a detent recess.

If the wind-deflector element is connected to the wiper strip element in an interlocking manner, the wiper blade device can be particularly quickly mounted.

A mounting of the wiper blade device can be further expedited if, after the wiper lip and the wiper strip element have been connected in an interlocking manner, a support element is inserted into the wiper strip element and forms an interlocking connection with a wiper blade adapter.

The wiper blade device can be particularly solidly embodied if, after the support element has been inserted into the wiper strip element, the longitudinal channel is closed in a materially bonded manner in at least one end region. By the term "end region", a region is to be particularly understood in this context which originates at a free end of the longitudinal channel, within the first and/or last 20%, preferably within the first and/or last 10%, of a longitudinal extension of the longitudinal channel.

A mounting of the wiper blade device can further be expedited if, after the wind-deflector element has been connected to the wiper strip element in an interlocking manner, at least one terminator element of the wind-deflector element is inserted into the wiper strip element and a movement of said wind-deflector element relative to said wiper strip element in a longitudinal direction is prevented.

The wiper blade device can be particularly solidly embodied if, after the wiper blade adapter has been placed on the wiper strip unit, a support element is inserted into the wiper strip unit and into a longitudinal guide unit of the wiper blade adapter, said support element preventing a movement of the wiper blade adapter relative to the wiper strip unit.

BRIEF DESCRIPTION OF THE DRAWINGS

Further advantages ensue from the following description of the drawings. An exemplary embodiment of the invention is depicted in the drawings. The drawings, the description and the claims contain numerous features in combination. It is useful for the person skilled in the art to also consider the features individually and to combine them to form further advantageous combinations.

In the drawings.

DETAILED DESCRIPTION

Figure 1:
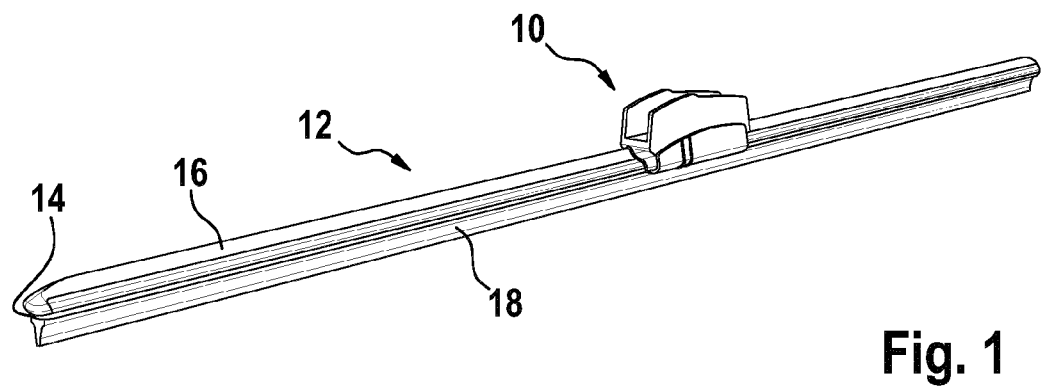
FIG. 1 shows a perspective view of a wiper blade device according to the invention in a mounted state.

FIG. 1 shows a perspective view of an inventive wiper blade device comprising a wiper strip unit 12, which has a wind-deflector element 16, a wiper lip 18 and a wiper strip element 14. The wind-deflector element 16 is connected to the wiper strip element 14 in an interlocking manner. The wiper lip 18 is likewise connected to said wiper strip element 14 in an interlocking manner.

A wiper blade adapter 10 is attached to the wiper strip unit 12. The wiper blade adapter 10 has a coupling region for coupling to a wiper arm of a motor vehicle (not depicted).

Figure 2:
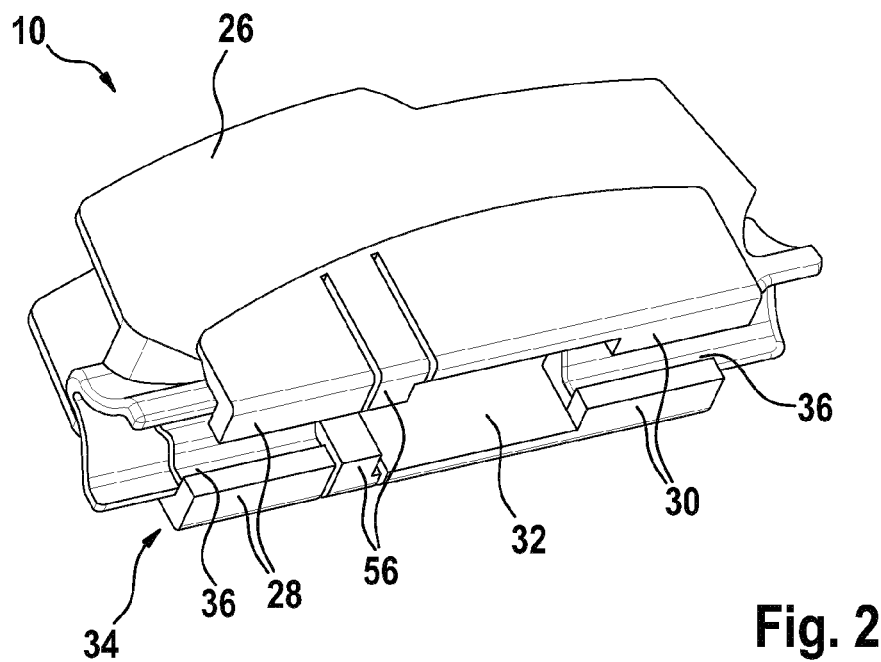
FIG. 2 shows a perspective view of the wiper blade adapter of a wiper blade device pursuant to FIG. 1.

FIG. 2 shows a perspective view of the wiper blade adapter 10, which has a base body 26, on which two fastening means 28, 30 are integrally formed. The fastening means 28, 30 adjoin a central recess 32 of the base body. In addition, two deflectable detent hooks 56 are disposed on the base body 26. The detent hooks 56 can deflect transversely to a main longitudinal extension of the wiper blade adapter 10, which, in a mounted state, runs parallel to a longitudinal direction 22 of the wiper strip unit 12. The longitudinal direction 22 extends parallel to a longitudinal extension of the wiper strip unit 12. In addition, four guide grooves 36 adjoin the central recess 32.

The wiper blade adapter 10 includes a longitudinal guide unit 34, which comprises four guide grooves 36. The guide grooves 36 are open towards one another and extend parallel to the main longitudinal extension of the wiper blade adapter 10.

Figure 3:
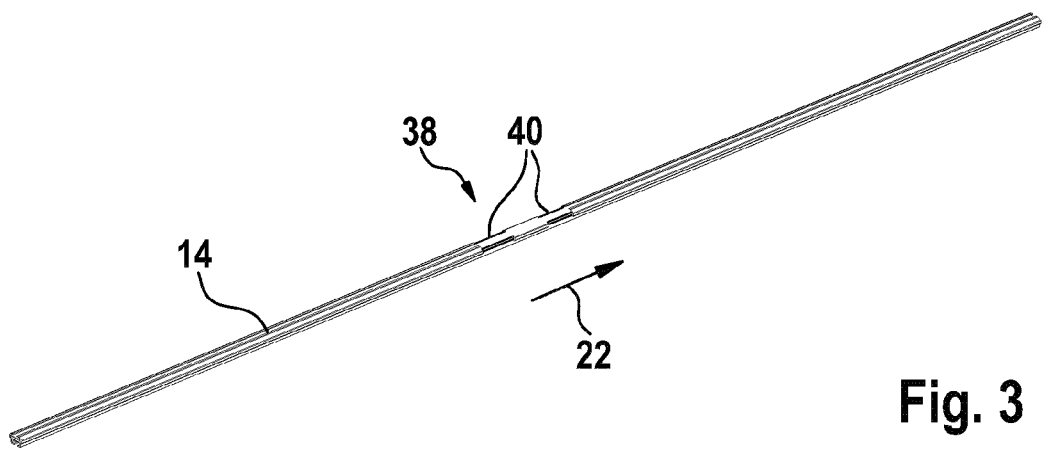
FIG. 3 shows a perspective view of a wiper strip element of a wiper blade device pursuant to FIG. 1.

The wiper strip element 14 is depicted in FIG. 3. Said wiper strip element 14 has a wiper blade adapter receiving area 38 which, when viewed in the longitudinal direction, extends from 45% to 55% of a longitudinal extension of the wiper strip element 14.

Figure 4:
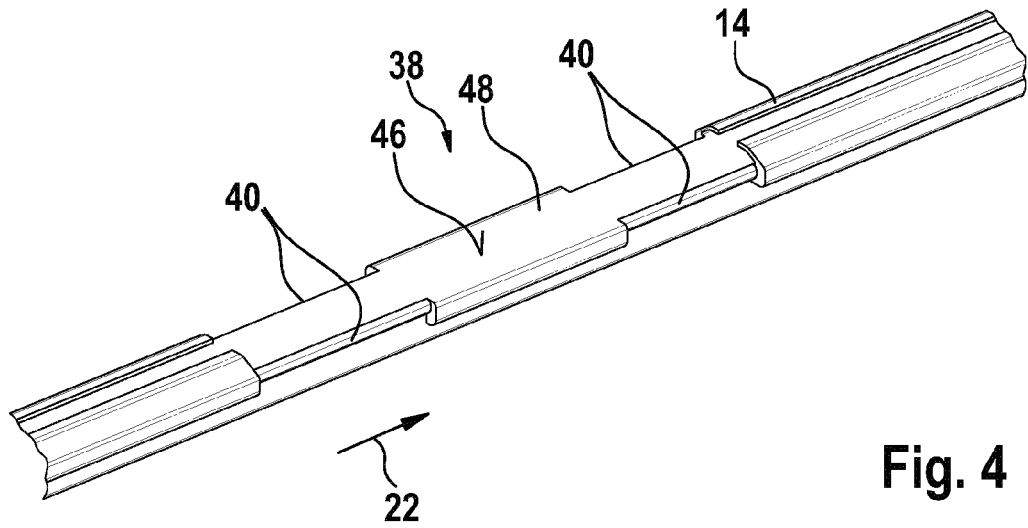
FIG. 4 shows a perspective view of a wiper blade adapter receiving area of the wiper strip element pursuant to FIG. 3.

As is shown in more detail in FIG. 4, the wiper strip element 14 has four fastening recesses 40 in the wiper blade adapter receiving area 38 thereof. The fastening recesses 40 adjoin a support surface 46. The support surface 46 is located on a support body 48, which is centrally arranged in the wiper blade adapter receiving area 38.

Figure 5:
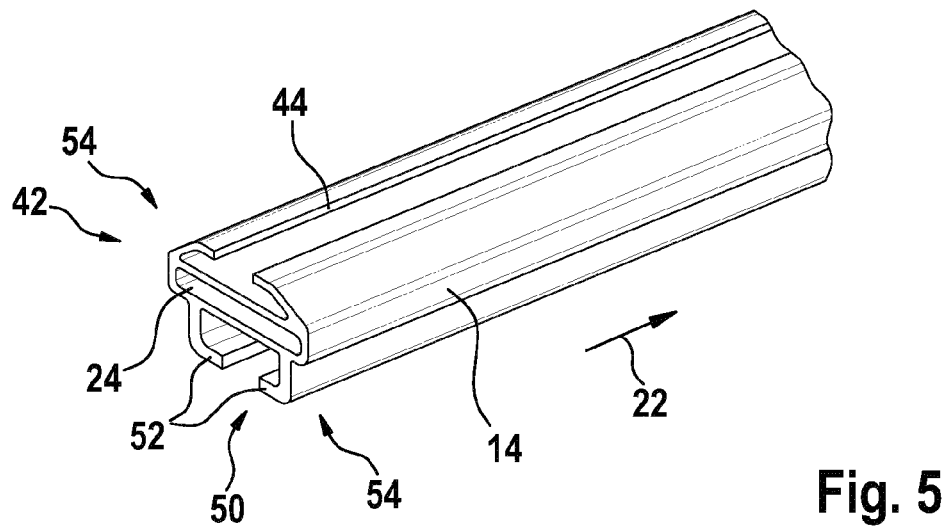
FIG. 5 shows a perspective view of an end region of the wiper strip element pursuant to FIG. 3.

A longitudinal guide channel 24 for receiving a resilient support element 20 runs in the longitudinal direction 22 in the wiper strip element 14, as is depicted in FIG. 5 in an end region of said wiper strip element 14. The longitudinal guide channel 24 has the same cross-section as the support element 20. When inserting the support element 20 into said longitudinal guide channel 24, an interlocking connection is formed. Within the support body 48, said longitudinal guide channel 24 is carried forward in the wiper blade adapter receiving area 38.

In order to fasten the wind-deflector element 16, a guide unit 42, which has a profile rail 44, is disposed on one side of the wiper strip element 14. The profile rail 44 extends in the main extension thereof parallel to the longitudinal direction 22.

A wiper lip guide unit 50 of the wiper strip element 14, which has two L-shaped guide profiles 52, is disposed on a side opposite to the guide unit 42. In a mounted state, a coupling component of the wiper lip 18 is disposed within the wiper lip guide unit 50 and forms an interlocking connection with the guide profiles 52.

Figure 6:
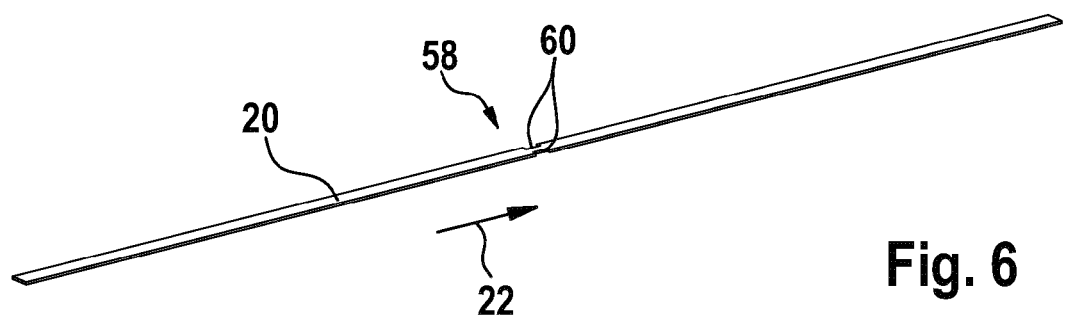
FIG. 6 shows a perspective view of a support element of a wiper strip unit pursuant to FIG. 3.
Figure 7:
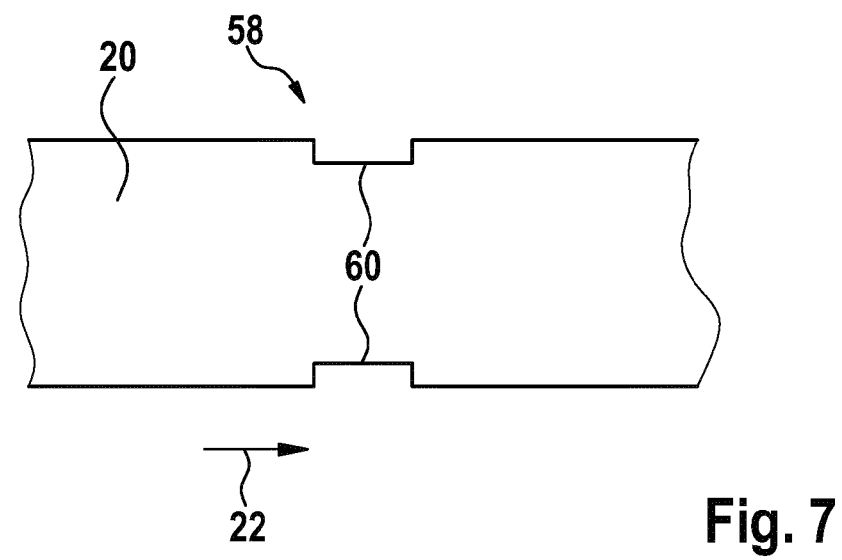
FIG. 7 shows a top view of a section of the support element pursuant to FIG. 6.

FIG. 6 shows a resilient support element 20 of the wiper strip unit 12. The support element 20 consists of spring steel and has a detent means 58 which is disposed in the center thereof and comprises two detent recesses 60. The detent recesses 60 are stamped out of the spring steel and have a rectangular profile, as is depicted in a top view in FIG. 7. When viewed in the longitudinal direction 22, the detent recesses 60 are arranged at the same height. In addition, the support element 20 has a thickness which corresponds to a width of the guide grooves 36.

Figure 8:
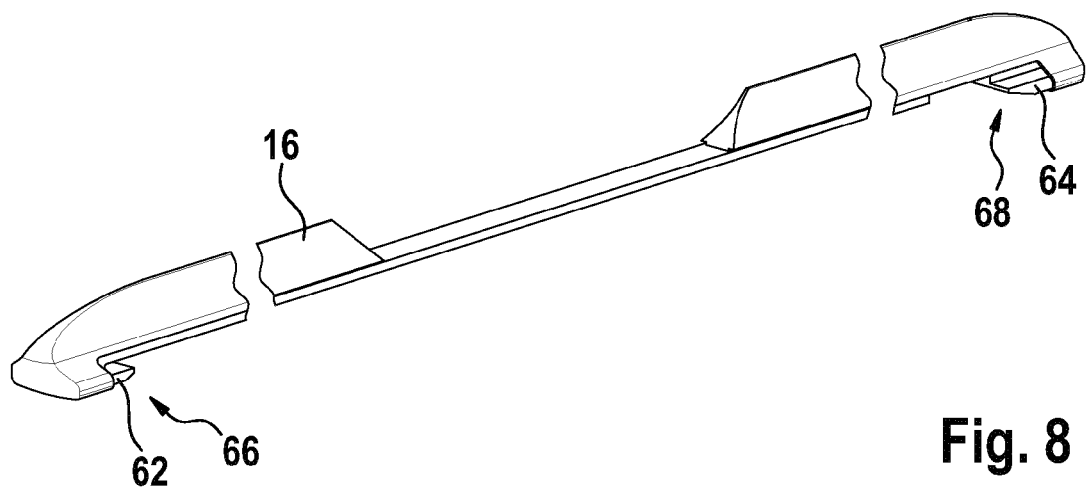
FIG. 8 shows a perspective view of a wind-deflector element of the wiper blade device pursuant to FIG. 1.

The wind-deflector element 16, as depicted in FIG. 8, has two terminator elements 62, 64, which are disposed in end regions 66, 68 of said wind-deflector element 16. Starting at a free end of said wind-deflector element 16, the end regions 66, 68 are located within the first and last 10% of a longitudinal extension of said wind-deflector element 16. The terminator elements 62, 64 have the same cross-section as the longitudinal guide channel 24 of the wiper strip element 14. In a mounted state, the terminator elements engage in the longitudinal guide channel 24.

Figure 9:
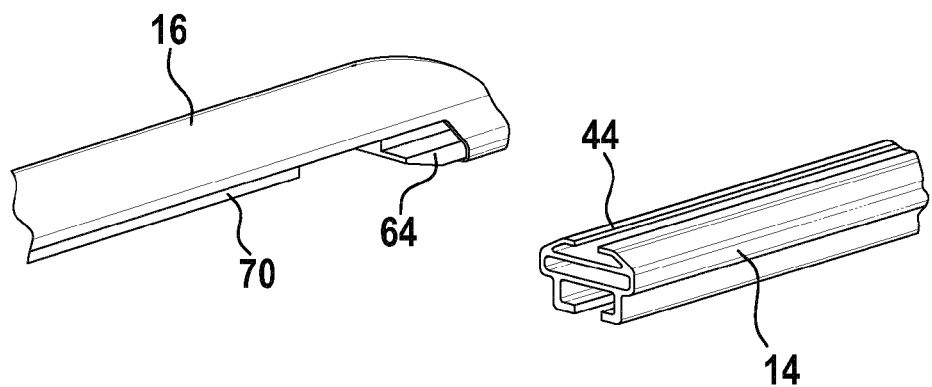
FIG. 9 shows a perspective view of the wiper blade device according to FIG. 1 during a first assembly step.

A first assembly step of the wiper blade device is depicted in FIG. 9. The wind-deflector element 16 is inserted into the profile rails 44 of the wiper strip element 14. In so doing, the profile rails 44 grip a longitudinal extension 70 of the wind-deflector element 16. Said wind-deflector element 16 is thereby connected to the wiper strip element 14 in an interlocking manner. The terminator element 62 is subsequently inserted into the guide profile 52 and thus prevents a movement of said wind-deflector element 16 relative to the wiper strip element 14 in the longitudinal direction 22. The other terminator element 64 remains for the time being outside of the guide profile 52.

Figure 10:
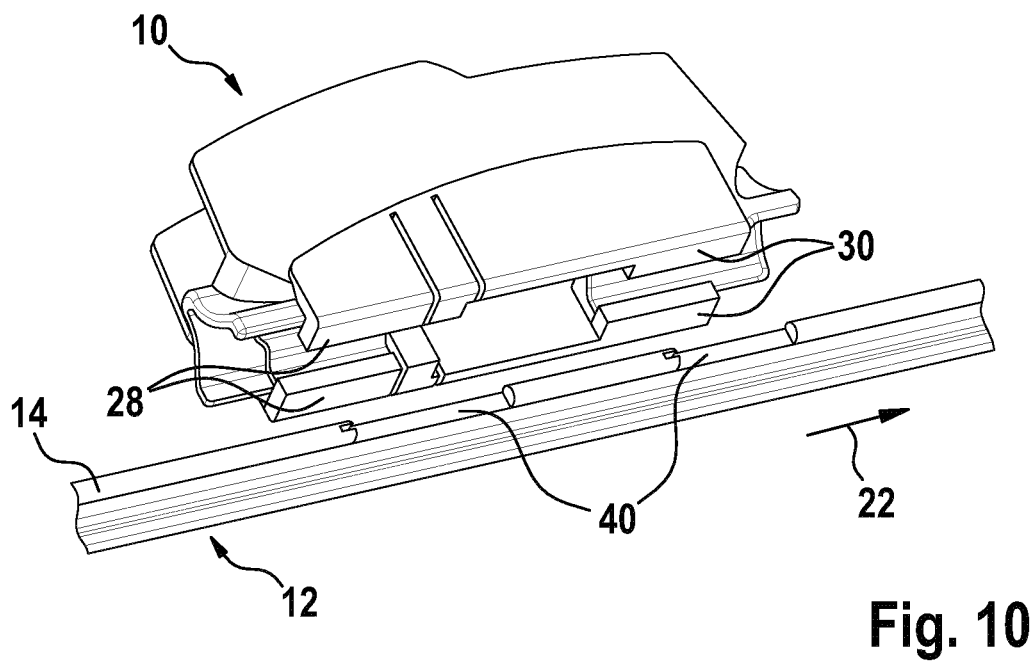
FIG. 10 shows a perspective view of the wiper blade device pursuant to FIG. 1 during a second assembly step and FIG. 11 shows a perspective view of the wiper blade device pursuant to FIG. 1 during a third assembly step.

In a second assembly step, as depicted in FIG. 10, the wiper blade adapter 10 is placed on the wiper strip element 14. The fastening means 28, 30 of the wiper blade adapter 10 thereby engage in an interlocking manner in the fastening recesses 40 of the of the wiper strip element 14. In a mounted state, the wiper blade adapter 10 rests on the support surface 46. The wiper blade adapter 10 forms an interlocking connection with the wiper strip unit 12. A movement of the wiper strip element 14 relative to the wiper blade adapter 10 is prevented in the longitudinal direction 22.

In a third assembly step, the wiper lip 18 is inserted into the wiper lip guide unit 50 and forms an interlocking connection with the same. As a result, the wiper strip element 14, in a mounted state, forms an interlocking connection with the wiper lip 18. In addition, the support element 20 is inserted into the longitudinal guide channel 24 of the wiper strip element 14. As a result, the support element 20, in a mounted state, forms an interlocking connection with the wiper strip element 14. The support element 20 leaves the longitudinal guide channel 24 in the wiper blade adapter receiving area 38 and is subsequently guided in the longitudinal guide unit 34 of the wiper blade adapter 10.

Figure 11:
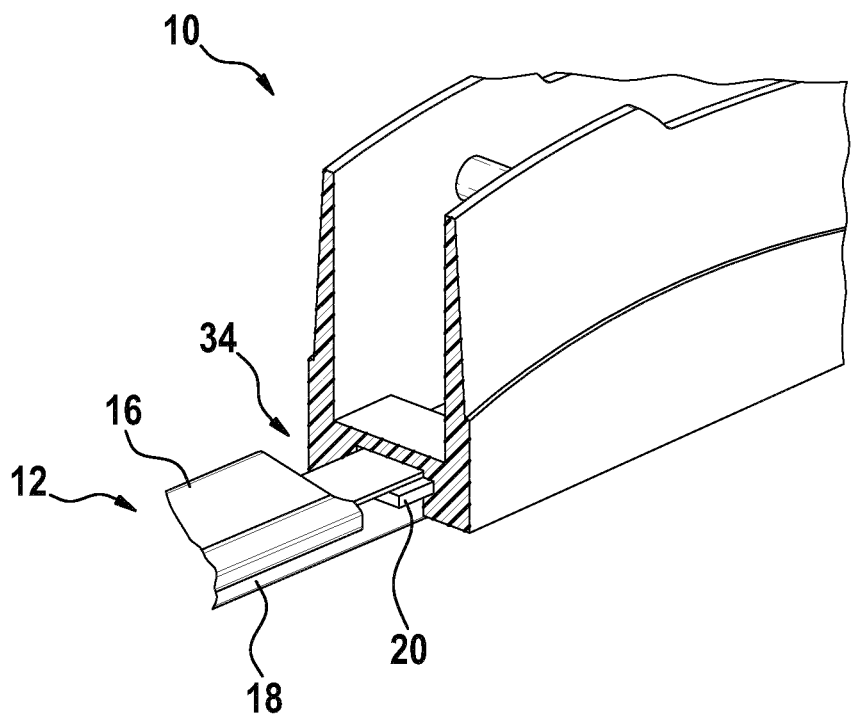

FIG. 11 shows the support element 20, which has been completely pushed through the longitudinal guide unit 34. The support element 20 forms an interlocking connection with the wiper blade adapter 10. Said wiper blade adapter 10 can thus no longer be detached from the wiper strip unit 12 but is fixedly connected to the same.

The support element 20 is pushed further in a fourth assembly step until said element is completely situated in the wiper strip unit 12. In order to prevent a movement of the support element 20 relative to the wiper strip unit 12, the other terminator element 64 of the wind-deflector element 16 is inserted into the longitudinal guide channel 24 of the wiper strip element 14. The longitudinal guide channel 24 and the wiper lip guide unit 50 are thereby closed in their two end regions 54. A movement of the support element 20 within the longitudinal guide channel 24 is prevented in any direction.

The support element 20 is furthermore secured by means of the detent hooks 56 of the wiper blade adapter 10, which engage in detent recesses 60 of the support element 20 and form a detent connection.

The detent hooks 56 are thereby initially deflected out of a starting position transversely to the longitudinal direction 22 and then move resiliently back into the starting position. In so doing, an interlocking connection with the detent recesses 60 is formed and a movement of the support element 20 relative to the wiper blade adapter 10 is prevented in the longitudinal direction 22.

What is claimed is:

1. A wiper blade device comprising a wiper strip unit (12) which has a wind-deflector element (16), a wiper lip (18) and an elongated wiper strip element (14) defining opposing first and second terminal longitudinal ends which comprises a longitudinal guide channel (24) configured to receive a resilient support element (20), wherein the wiper strip element (14), in a mounted state, forms an interlocking connection with the wind-deflector element (16), and wherein the wind-deflector element (16) has at least one terminator element (62, 64) which, in a mounted state, extends longitudinally into at least one longitudinal channel in the wiper strip element (14) to form an interlocking connection with the wiper strip element (14) and prevents a movement of the wind-deflector element (16) relative to the wiper strip element (14) in a longitudinal direction (22), wherein the at least one longitudinal channel is selected from a group consisting of the longitudinal guide channel (24) and a guide profile (52) of the wiper strip element (14) that receives the wiper lip (18), wherein the wind-deflector element (16) is a single piece extending from said first terminal longitudinal end to said second terminal longitudinal end, wherein the at least one terminator element includes a first terminator element (64) at one end of the wind-deflector element (16) and a second terminator element (62) at an opposite end of the wind-deflector element (16).

2. The wiper blade device according to claim 1, characterized in that the wiper strip unit (12) comprises a resilient support element (20) disposed in the longitudinal guide channel (24) which, in a mounted state, forms an interlocking connection with the wiper strip element (14).

3. A wiper blade device according to claim 2, wherein the support element (20) has at least one detent means (58) which, in a mounted state, forms a detent connection to a wiper blade adapter (10).

4. The wiper blade device according to claim 1, characterized by a wiper blade adapter (10) which, in a mounted state, forms an interlocking connection with the wiper strip unit (12).

5. The wiper blade device according to claim 4, characterized in that the wiper blade adapter (10) has a longitudinal guide unit (34) which receives the support element (20) in an interlocking manner.

6. The wiper blade device according to claim 1, wherein the at least one terminator element (62, 64) includes a terminator element (62) that extends into the guide profile (52).

7. The wiper blade device according to claim 1, wherein the at least one terminator element (62, 64) includes a terminator element (64) that extends into the longitudinal guide channel (24).

8. The wiper blade device according to claim 1, wherein the at least one terminator element (62, 64) includes a first terminator element (64) that extends into the longitudinal guide channel (24) and a second terminator element (62) that extends into the guide profile (52).

9. The wiper blade device according to claim 1, further comprising a support element (20) disposed within the longitudinal guide channel (24).

10. The wiper blade device according to claim 1, further comprising a support element (20) disposed within the longitudinal guide channel (24).

* * * * *